United States Patent
Chen et al.

(10) Patent No.: US 11,627,181 B2
(45) Date of Patent: *Apr. 11, 2023

(54) SYSTEMS AND METHODS OF BALANCING NETWORK LOAD FOR ULTRA HIGH SERVER AVAILABILITY

(71) Applicant: COUPANG CORP., Seoul (KR)

(72) Inventors: Zhan Chen, Seattle, WA (US); Seong Hyun Jeong, Seoul (KR); Hyeong Gun Lee, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/338,017

(22) Filed: Jun. 3, 2021

(65) Prior Publication Data

US 2022/0021730 A1    Jan. 20, 2022

Related U.S. Application Data

(63) Continuation of application No. 16/928,104, filed on Jul. 14, 2020, now Pat. No. 11,032,361.

(51) Int. Cl.
*H04L 67/1008* (2022.01)
*H04L 67/1012* (2022.01)
(Continued)

(52) U.S. Cl.
CPC ........ *H04L 67/1008* (2013.01); *H04L 47/125* (2013.01); *H04L 67/1001* (2022.05);
(Continued)

(58) Field of Classification Search
None
See application file for complete search history.

(56) References Cited

U.S. PATENT DOCUMENTS 5,898,870 A * 4/1999 Okuda .................. G06F 9/505
                                                    718/104
6,108,646 A  8/2000 Mohri et al.
(Continued)

FOREIGN PATENT DOCUMENTS

CN        102932440 A    2/2013
CN        103577407 A    2/2014
(Continued)

OTHER PUBLICATIONS

Notice of Preliminary Rejection dated Aug. 13, 2021, from corresponding Korean Patent Application No. 10-2020-0180759 (11 pages).

(Continued)

*Primary Examiner* — Lashonda Jacobs-Burton
(74) *Attorney, Agent, or Firm* — Finnegan, Henderson, Farabow, Garrett & Dunner LLP

(57) ABSTRACT

Systems and methods for monitoring utilization rates of a plurality of network-connected databases; receiving a first data read request from a first user device for a data element stored in the plurality of network-connected databases; selecting a first target database among the plurality of network-connected databases based on the utilization rates and a load sharing ratios; generating a first data query for a copy of the data element stored in the first target database; and forwarding the copy of the data element from the first target database to the first user device in response to the first data read request.

20 Claims, 10 Drawing Sheets

(51) Int. Cl.
  *H04L 67/1029* (2022.01)
  *H04L 67/1097* (2022.01)
  *H04L 47/125* (2022.01)
  *H04L 67/1036* (2022.01)
  *H04L 67/1001* (2022.01)
  *H04L 67/1004* (2022.01)
  *G06F 11/34* (2006.01)

(52) U.S. Cl.
  CPC ...... *H04L 67/1004* (2013.01); *H04L 67/1012* (2013.01); *H04L 67/1029* (2013.01); *H04L 67/1036* (2013.01); *H04L 67/1097* (2013.01); *G06F 11/3433* (2013.01)

(56) References Cited

U.S. PATENT DOCUMENTS

| | | | | |
|---|---|---|---|---|
| 6,128,657 | A * | 10/2000 | Okanoya | H04L 67/1001 709/224 |
| 6,374,297 | B1 * | 4/2002 | Wolf | H04L 67/1008 709/201 |
| 6,639,904 | B1 * | 10/2003 | Boyer | H04W 16/06 370/341 |
| 6,950,848 | B1 * | 9/2005 | Yousefi'zadeh | H04L 67/101 709/217 |
| 8,046,769 | B2 * | 10/2011 | Masuda | G06F 11/3495 702/182 |
| 8,209,696 | B2 * | 6/2012 | Ferguson | G06F 16/27 707/704 |
| 8,930,419 | B2 * | 1/2015 | Matula | G06F 16/2455 707/812 |
| 9,047,355 | B2 * | 6/2015 | Ferguson | G06F 16/24534 |
| 9,231,999 | B2 * | 1/2016 | Turk | H04L 67/1023 |
| 9,742,674 | B1 * | 8/2017 | Kreidenko | H04L 43/04 |
| 10,303,702 | B2 * | 5/2019 | Levari | G06F 16/278 |
| 10,496,645 | B1 * | 12/2019 | Asner | G06F 16/24544 |
| 10,503,613 | B1 * | 12/2019 | Moses | H04L 67/59 |
| 10,649,962 | B1 * | 5/2020 | Wilton | G06F 16/1734 |
| 10,757,176 | B1 * | 8/2020 | Petit-Huguenin | H04L 67/51 |
| 11,080,262 | B1 * | 8/2021 | Levandoski | G06F 16/2282 |
| 11,381,639 | B1 * | 7/2022 | Smith | H04L 67/1001 |
| 2006/0067503 | A1 * | 3/2006 | Caugherty | H04Q 3/0025 370/352 |
| 2007/0143460 | A1 * | 6/2007 | Ben-David | H04L 67/1001 709/223 |
| 2010/0106697 | A1 * | 4/2010 | Enoki | G06F 9/52 707/704 |
| 2012/0131093 | A1 * | 5/2012 | Hamano | G06F 9/5088 709/203 |
| 2013/0024559 | A1 * | 1/2013 | Susanta | G06F 9/5061 709/224 |
| 2013/0324076 | A1 * | 12/2013 | Harrang | H04W 28/0812 455/405 |
| 2015/0149635 | A1 * | 5/2015 | Rajagopalan | G06F 9/5083 709/226 |
| 2015/0261620 | A1 * | 9/2015 | Ruiz | G06F 11/1451 707/649 |
| 2017/0102757 | A1 * | 4/2017 | Kang | H04L 43/08 |
| 2019/0065258 | A1 | 2/2019 | Irudayaraj et al. | |
| 2020/0050485 | A1 * | 2/2020 | Anderson | H04L 47/125 |

FOREIGN PATENT DOCUMENTS

| | | |
|---|---|---|
| CN | 110740293 A | 1/2020 |
| JP | 2018-530068 | 10/2018 |
| JP | 2020-514935 | 5/2020 |
| KR | 10-2008-0008699 A1 | 1/2008 |
| KR | 10-1589213 B1 | 1/2016 |
| TW | 201902224 A | 1/2019 |

OTHER PUBLICATIONS

Office Action dated Aug. 30, 2021, in counterpart Taiwanese Patent Application No. 109147088 (33 pages).

PCT International Search Report and Written Opinion dated Apr. 19, 2021 issued in International Application No. PCT/IB2021/050348 (9 pgs.).

Examination Notice received in counterpart Hong Kong Patent Application No. 22021030174.7, dated Apr. 25, 2022 (5 pages).

* cited by examiner

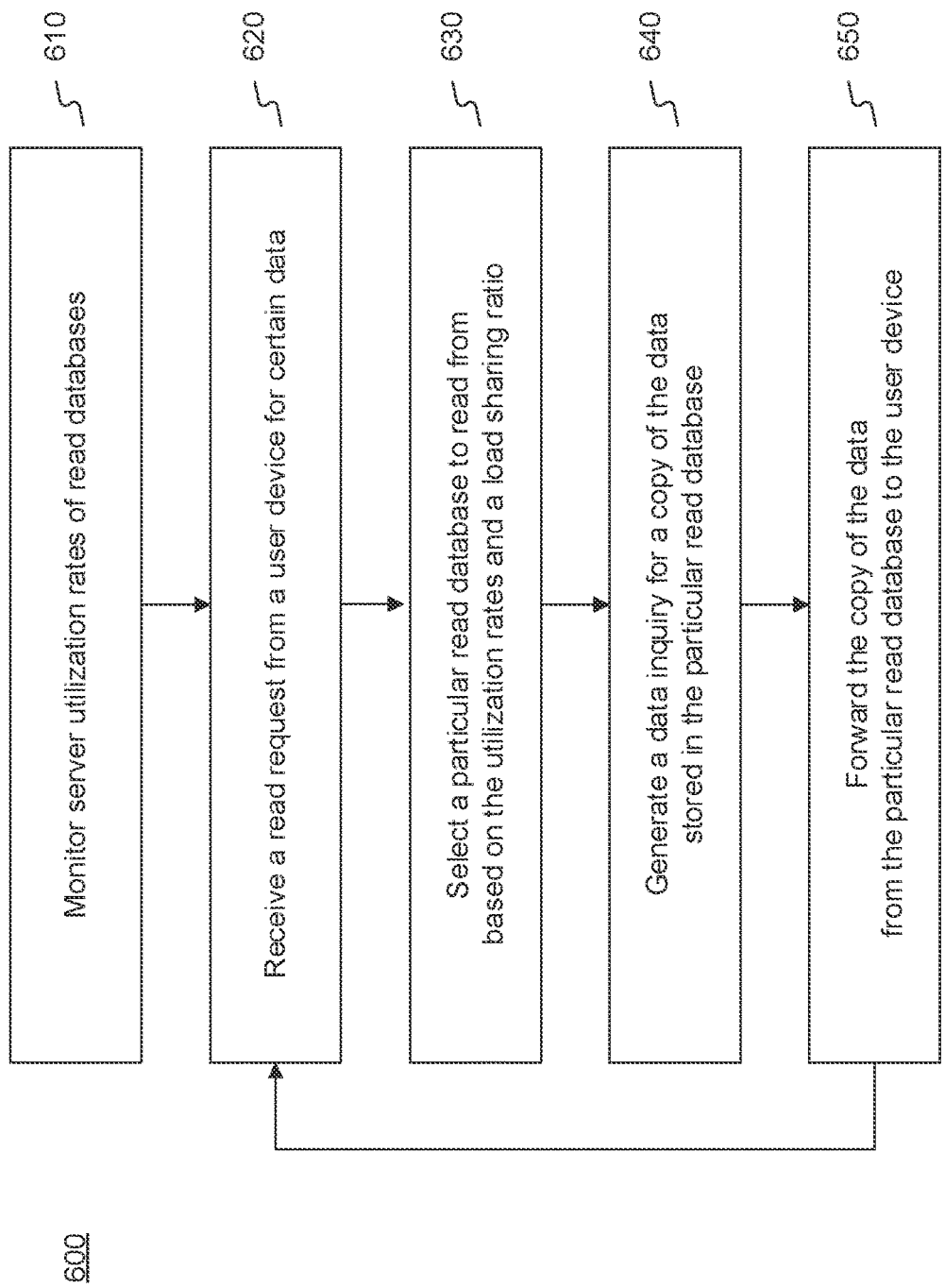

SYSTEMS AND METHODS OF BALANCING NETWORK LOAD FOR ULTRA HIGH SERVER AVAILABILITY

RELATED APPLICATIONS

This application is a continuation of U.S. patent application Ser. No. 16/928,104 filed on Jul. 14, 2020 (now U.S. Pat. No. 11,032,361), the entire contents of all of which are hereby incorporated by reference in the present application.

TECHNICAL FIELD

The present disclosure generally relates to computerized methods and systems for balancing network load or traffic across multiple servers to achieve ultra high server availability. In particular, embodiments of the present disclosure relate to inventive and unconventional systems that maximize uptime and minimize error from prolonged usage of servers by intelligently routing network traffic across multiple servers.

BACKGROUND

In today's society where increasing number of day-to-day activities are performed online, the number of devices accessing the Internet and the amount of data stored online are increasing exponentially. However, the Internet is not an abstract place online where the vast amount of data is stored. It is a web of connections between client devices (e.g., mobile phone, computer, server) and storage devices (e.g., hard drives), which are physically housed somewhere like a data center or a server farm.

A server refers to a computer program that runs on a computer system comprising an array of storage devices. For example, a website is hosted on a server when a set of computer-readable data files for the website (e.g., computer-readable instructions for rendering the website, image files for display on the website) are stored in the storage devices of the server. When a user accesses the website by entering its web address into a web browser, the user's device (i.e., client device) sends a query to the server to retrieve appropriate files and processes them to display the website on the web browser.

While simple in nature, individual queries for accessing files stored in a server can add up to an enormous load on the server. Sudden surges in queries are known to cause server crashes, such as when game servers are flooded with queries from millions of people logging into the game on its launch date and when ticketing websites are flooded when tickets for a famous artist's concert are released.

Furthermore, servers cannot stay constantly online for an indefinite period. They must be taken offline from time to time for maintenance, at which point any service provided by the server (e.g., website, game, etc.) is inaccessible to users.

Some have implemented multiple servers to address this issue. In such implementation, the loads created by incoming queries are shared among the servers. However, the user devices are not programmed to determine which server it should send its queries for optimal service, and programming individual user devices with said ability adds complexity to the overall dynamic. Implementing the routing algorithm to the millions of user devices would make the device more susceptible to failure due to the added complexity.

Therefore, there is a need for systems and methods for managing network loads created by incoming queries behind the scenes, so that the incoming queries are allocated to different servers without any additional instructions from the user devices. Such systems and methods would lessen the load on individual servers, lowering their failure rate, and achieve a greater uptime as a whole, where the loads are shifted among different servers so that a subset of the servers can be taken offline while the service remains online.

SUMMARY

One aspect of the present disclosure is directed to a computer-implemented system for routing network traffic. The system may comprise a memory storing instructions and at least one processor configured to execute instruction. The instructions may comprise: monitoring utilization rates of a plurality of network-connected databases; receiving a first data read request from a first user device for a data element stored in the plurality of network-connected databases; selecting a first target database among the plurality of network-connected databases based on the utilization rates and a load sharing ratios; generating a first data query for a copy of the data element stored in the first target database; and forwarding the copy of the data element from the first target database to the first user device in response to the first data read request.

Yet another aspect of the present disclosure is directed to a computer-implemented method for routing network traffic. The method may comprise: monitoring utilization rates of a plurality of network-connected databases; receiving a first data read request from a first user device for a data element stored in the plurality of network-connected databases; selecting a first target database among the plurality of network-connected databases based on the utilization rates and a load sharing ratios; generating a first data query for a copy of the data element stored in the first target database; and forwarding the copy of the data element from the first target database to the first user device in response to the first data read request.

Still further, another aspect of the present disclosure is directed to a computer-implemented system for routing network traffic. The system may comprise: a plurality of network-connected databases configured to store an identical set of data; a coordinator configured to monitor network traffic and network loads of the plurality of network-connected databases; and a servicer configured to receive a plurality of user requests to retrieve information stored in the plurality of network connected databases, wherein the coordinator is further configured to route a subset of the plurality of user requests to a first database among the plurality of network-connected databases, wherein the first database is configured to transmit data in response to the subset of the plurality of user requests.

Other systems, methods, and computer-readable media are also discussed herein.

BRIEF DESCRIPTION OF THE DRAWINGS

FIG. 6 is a flowchart of an exemplary computerized process for processing incoming queries, consistent with the disclosed embodiments.

DETAILED DESCRIPTION

Figure 1A:
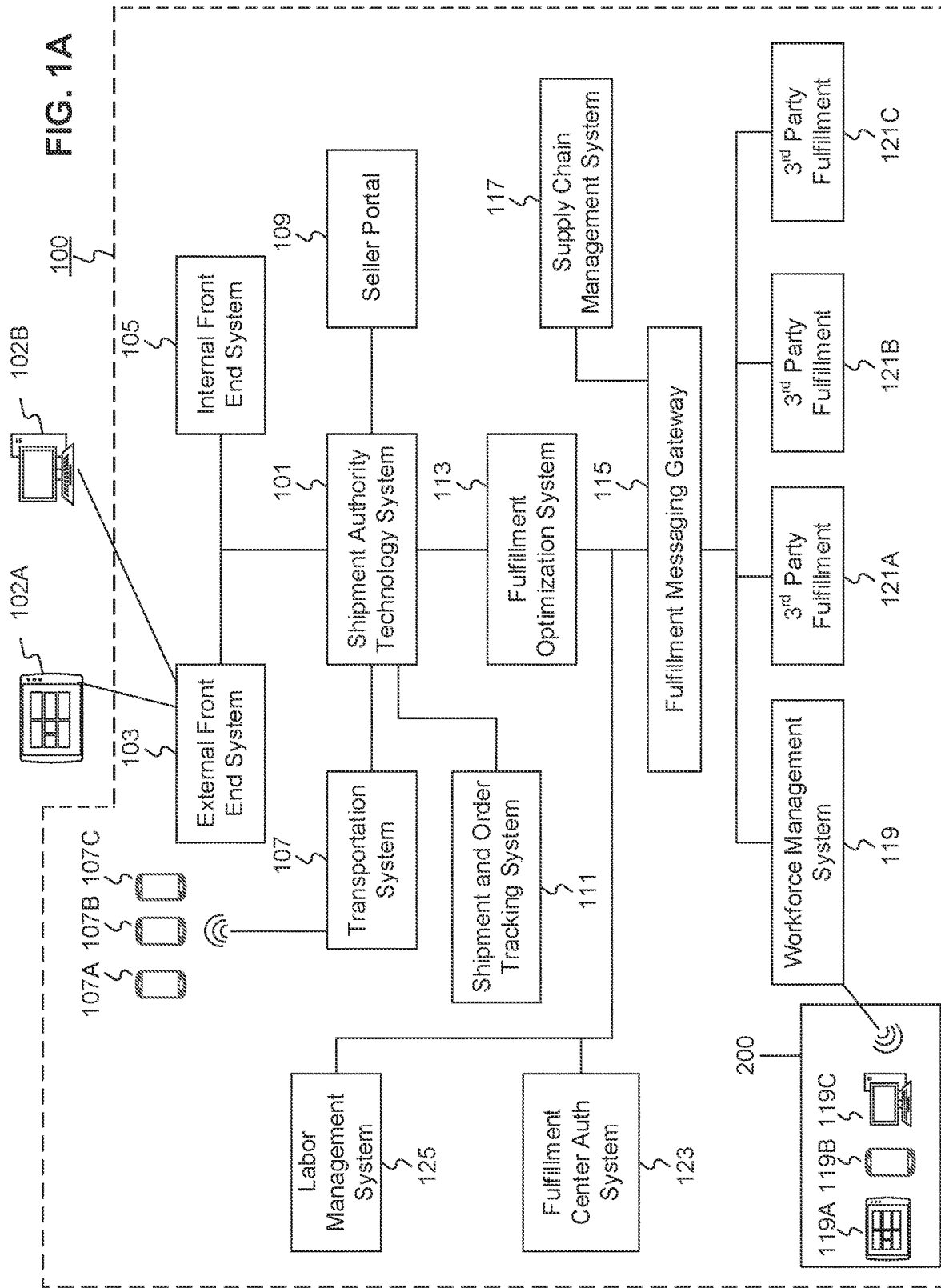
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computerized methods and systems that routes network traffic across multiple servers intelligently, where constant uptime and minimal error rate are desired.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3rd party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
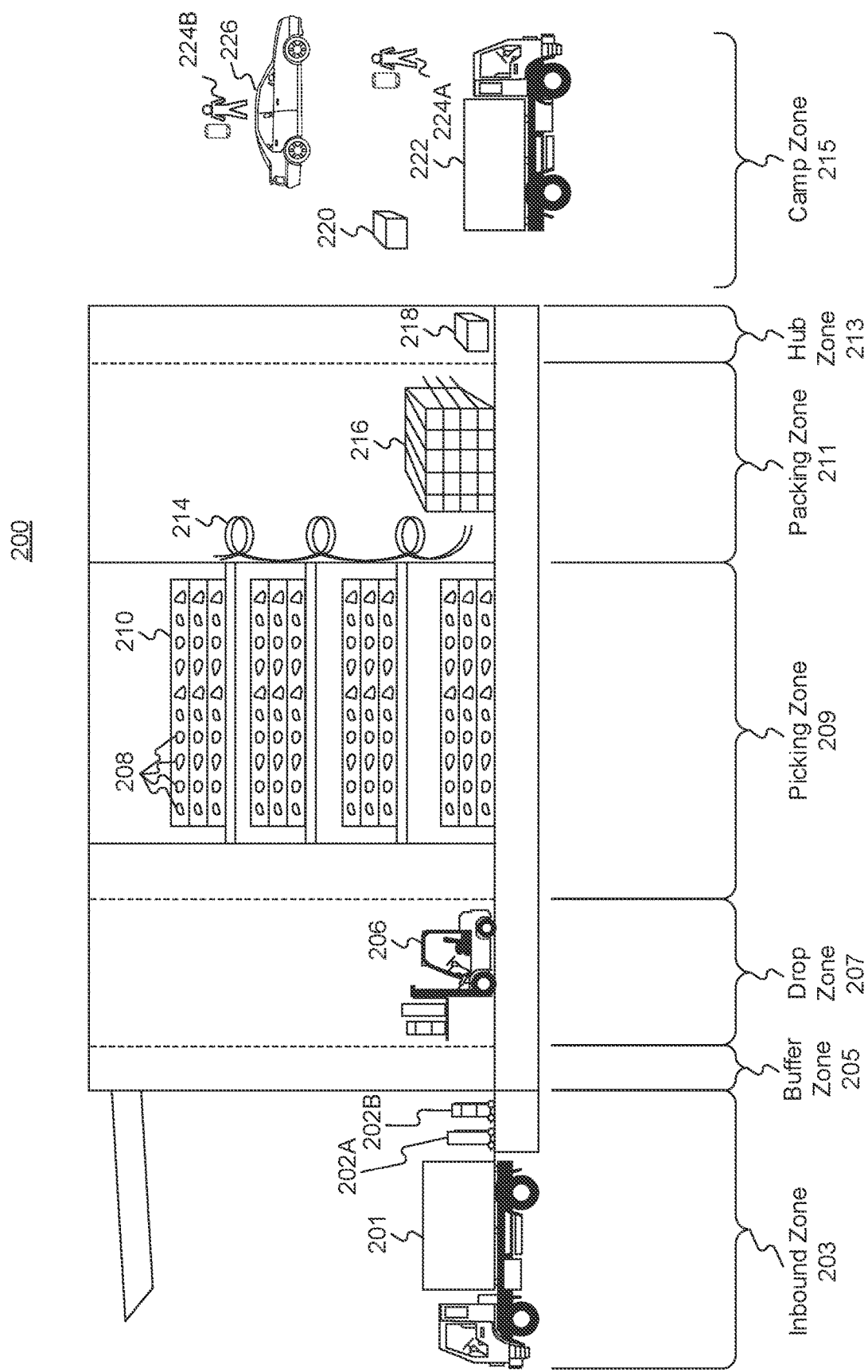
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
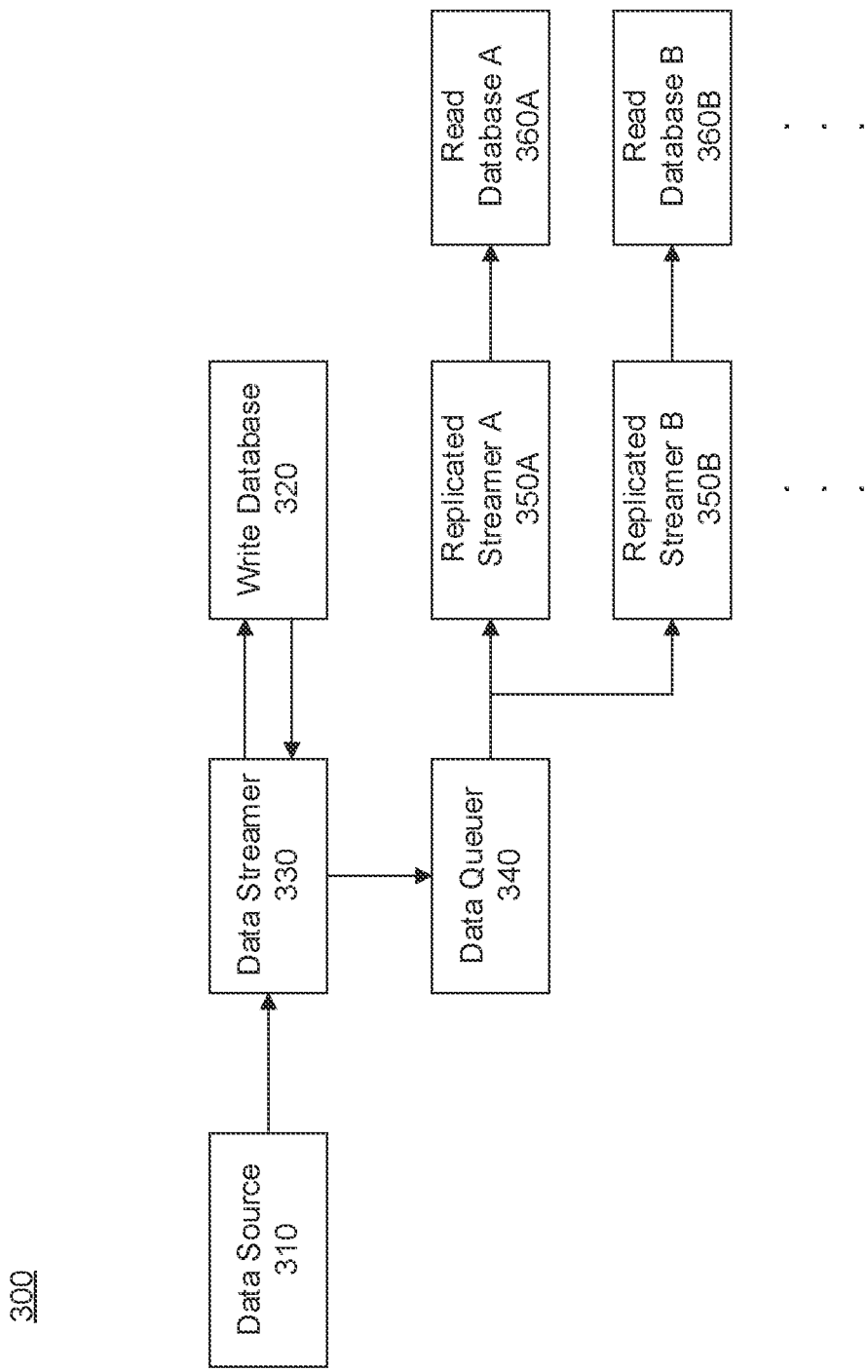
FIG. 3 is a schematic block diagram illustrating an exemplary embodiment of a networked environment comprising computerized systems for updating databases with new information and replicating it to multiple databases, consistent with the disclosed embodiments.

FIG. 3 is a schematic block diagram illustrating an exemplary embodiment of a networked environment 300 for updating databases with new information and replicating it to multiple databases. Networked environment 300 may comprise a variety of computerized systems, each of which may be connected to one another via one or more networks. In some embodiments, each of the elements depicted in FIG. 3 may represent a group of systems, individual systems in a network of systems, functional units or modules inside a system, or any combination thereof. And in some embodiments, each of the elements may communicate with each other via one or more public or private network connections including the Internet, an intranet, a WAN (Wide-Area Network), a MAN (Metropolitan-Area Network), a wireless network compliant with the IEEE 802.11a/b/g/n Standards, a wired network, or the like. The individual systems can also be located within one geographical location or be geographically dispersed.

In some embodiments, the depicted systems include a data source 310, a write database 320, a data streamer 330, a data queuer 340, one or more replicated streamers (e.g., replicated streamer A 350A), and one or more read databases (e.g., read database A 360A). Write database 320 and read databases (e.g., 360A-360B) may be collectively referred to as a database and may be implemented with SQL, Oracle, Cassandra, or other similar RDMBS (relational database management system). While only two pairs of replicated streamer and read databases are depicted in FIG. 3, the number is only exemplary and additional pairs of replicated streamers and read databases may be implemented.

Furthermore, each system depicted in FIG. 3 may take the form of a server, general-purpose computer, a mainframe computer, a special-purpose computing device such as a graphical processing unit (GPU), laptop, or any combination of these computing devices. In other embodiments, each system or a subset of the systems may be implemented as one or more functional units of a single system. Additionally or alternatively, each system or a subset thereof may be a standalone system, or a part of a subsystem, which may be part of a larger system.

Data source 310, in some embodiments, may be any computerized system configured to provide new information to be stored in write database 330 and read databases 360A and 360B. For example, data source 310 may be a server of its own, another computerized system, or another database. In some embodiments, data source 310 may comprise more than one computerized system, each configured to generate new information to be stored in write database 330.

More specifically, in some embodiments, data source 310 may be a database associated with a fulfillment center that collect, accrue, and/or generate various data accrued from various activities at FC 200 as described above with respect to FIG. 2. In this example, data accrued at data source 310 may include, among others, product identifiers (e.g., stock keeping unit (SKU)) of every product handled by a particular FC (e.g., FC 200), current inventory level of each product, and availability of different services (e.g., same day delivery, in-person installation) for each product. Alternatively, data source 310 may be a system such as SAT system 101, SOT system 111, and/or FO system 113 described above with respect to FIG. 1A.

Write database 320, in some embodiments, may be a computerized system configured to collect, organize, and store various data. Write database 320 may be a relational database where data stored therein is organized in one or more data sets. Contrary to conventional databases that are configured to both accept new data for storage and make the data available for client devices (e.g., mobile devices 107A-107C), write database 320 may be configured solely to collect and maintain the latest data set by accepting new data from data source 310 without being accessible by a client device. Compared to conventional databases, separating the read and write functionalities into dedicated databases (e.g., write database 320 and read databases 360A-360B) allows each functionality to take place without being intermingled with the other, thus lowering the risk of write or read errors.

Data streamer 330, in some embodiments, may include one or more computing devices configured to receive new information from data source 310 and update write database 320 to incorporate the new information. The new information may comprise an entire data set as organized in write database 320 (e.g., in the case of a new data record) or a data element comprising a portion of a data set (e.g., in the case of updating an existing data record). Regardless of the case, data streamer 330 may be configured to identify a data set in write database 320 that corresponds to the new information and overwrite the data set with the new information in a process described below with respect to FIG. 4.

Data queuer 340, in some embodiments, may include one or more computing devices configured to receive new or updated data set from write database 320 via data streamer 330 and adds it to a buffer where a series of data sets waiting to be replicated to read databases 360A-360B are queued. In some embodiments, data queuer 340 may comprise a storage medium such as a hard disk drive, solid state drive, RAM, ROM, or flash memory for storing the buffer. Each data set queued in data queuer 340 may be associated with a timestamp corresponding to the time when the data set was written to write database 320. The buffer may comprise a stack, a sequence, a queue, or other data structure configured to hold data for a certain amount of time. In some embodiments, the stack, sequence, or queue comprising the buffer may follow a First In First Out (FIFO) method, where the first data set added to the buffer is outputted first to replicated streamers 350A-350B. In further embodiments, data queuer 340 may also be configured to store the series of data sets indefinitely as a backup for data recovery or record keeping purposes.

In some embodiments, the queue may serve as a temporary repository of new data set before they are replicated to read databases 360A-360B. This allows separation of write process described above and replication process described below, so that any error that occurs while replicating the data sets to each read database would not impact new information being written to write database 320. Moreover, the timestamps may allow each replicated streamer to monitor how much new information has been replicated to associated read database, so that they can pause and resume the replication process independently of the other replicated streamers.

For example, when replicated streamer A 350A encounters an error that causes it to stop replicating new data set to read database A 360A at time X, data queuer 340 can continue accruing new data set from write database 320 onto the queue, and replicated streamer B 350B can continue replicating new data set to read database B 360B even beyond time X. Once the error in replicated streamer A 350A or read database A 360A is resolved, replicated streamer A 350A may resume replicating new data set to read database A 360A from timestamp X.

Replicated streamers 350A-350B, in some embodiments, may each include one or more computing devices configured to read new data sets from the queue in data queuer 340 and overwrite the new data sets onto respective read databases through a process described below with respect to FIG. 4. Each replicated streamer 350A-350B may be assigned to a read database (e.g., read database A 350A), which the streamer is responsible for keeping up-to-date. Accordingly, in some embodiments, each replicated streamer 350A-350B may be implemented as a separate system in order to allow each streamer to operate independently of each other even when one were to fail.

In some embodiments, each replicated streamer 350A-350B may keep track of the new data set retrieved from data queuer 340 and its associated timestamp, which may assist each replicated streamer 350A-350B in keeping track of its progress through the queue in data queuer 340 and allow it to resume replication even after a hiatus due to, for example, maintenance or error.

Read databases 360A-360B, in some embodiments, may be a computerized system configured to store data set as organized in write database 320. Each read database 360A-360B may be a relational database where data stored therein is organized in one or more data sets. Each read database 360A-360B may further be configured to store data set identical to those stored in write database 320, subject to the replication progress of associated replicated streamer. For example, if write database 320 includes data sets 1-10 (i.e., master set), each read database 360A-360B may be configured to replicate and store data sets 1-10.

At certain points in time, however, the data sets stored in each read database 360A-360B may differ due to a delay caused during the replication process data queuer 340 and respective replicated streamers 350A-350B or due to different replication schedules of replicated streamers 350A-350B. For example, if write database 320 is updated to hold data sets 1-10 (i.e., master set) at time $t_1$ and is updated again to hold data sets 1-15 at time $t_2$, and an error occurs in replicated streamer A 350A at $t_3$, right after read databases 350-350B are updated to hold data sets 1-10, read database A 360A would continue holding data sets 1-10 at $t_4$, while read database B 360B would be updated again to hold data sets 1-15. In another example, if replicated streamer A 350A and replicated streamer B 350B took turns reading new data sets from data queuer 340 and replicating them to their respective read databases 360A-360B, one read database will always lag behind the other read database until the lagging read database is updated to hold the same data set. In this way, read databases 360A-360B may hold similar data sets, which may be different versions of the master set stored in write database 320.

Figure 4:
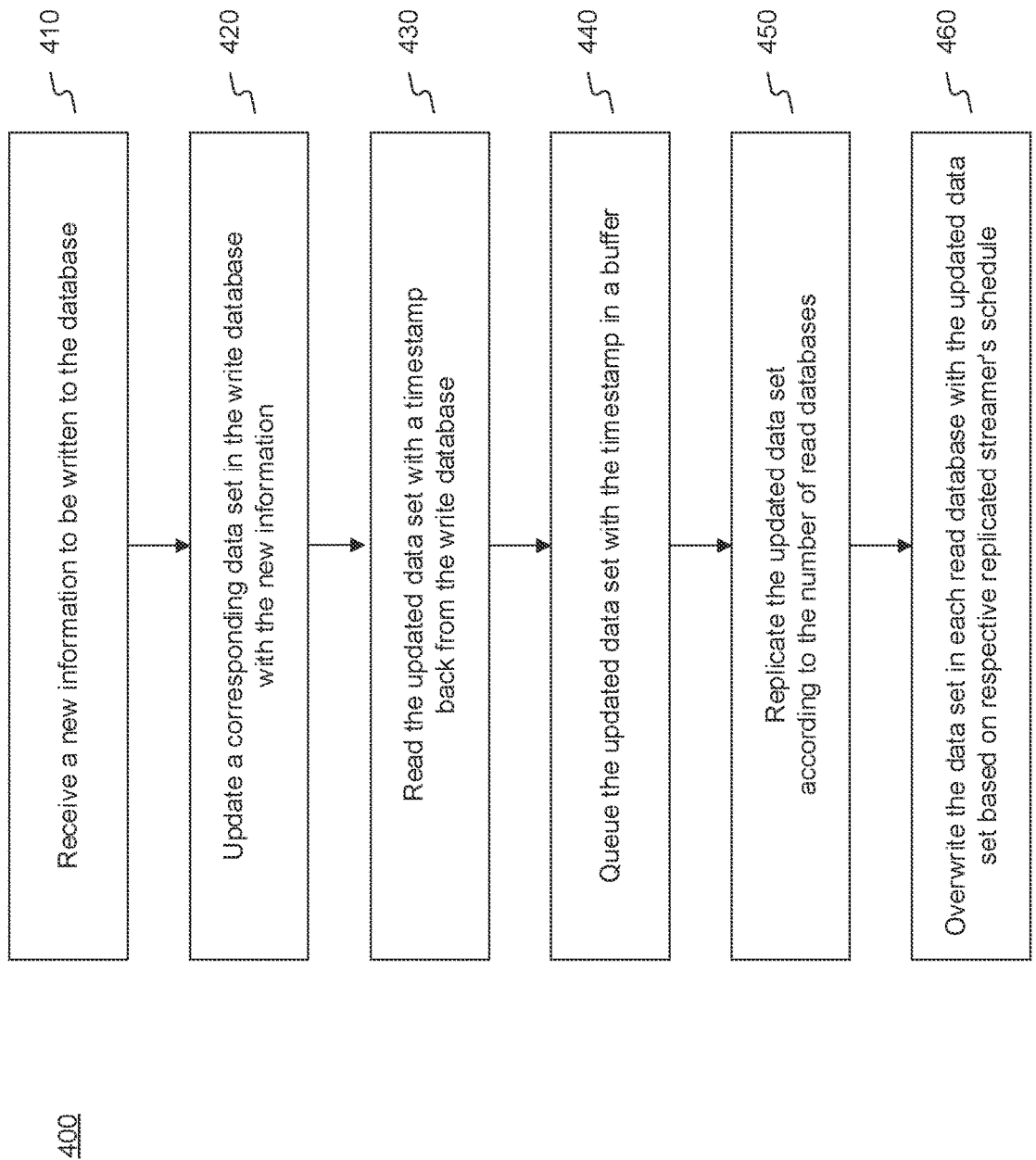
FIG. 4 is a flowchart of an exemplary computerized process for updating databases with new information and replicating it to multiple databases, consistent with the disclosed embodiments.

FIG. 4 is a flowchart of an exemplary computerized process 400 for updating databases with new information and replicating it to multiple databases. Process 400 may be implemented on any server that must service a large number of queries such as, for example, SAT System 101, SOT system 111, and/or FO system 113. Such server may comprise networked systems such as those described above in FIG. 3. Process 400 is described below with reference to the networked systems of FIG. 3, but any other configuration of systems, subsystems, or modules may be used to perform process 400.

At step 410, data source 310 may make available, and data streamer 330 may receive, new information to be written into the database (i.e., write database 320 and read databases 360A-360B). As discussed above, the new information may comprise an entire data set as organized in write database 320 (e.g., in the case of a new data record) or a data element comprising a portion of a data set (e.g., in the case of updating an existing data record).

At step 420, data streamer 330 may identify a data set in write database 320 that correspond to the new information and update the data set with the new information. Data streamer 330 may identify the corresponding data set in any number of ways, including but not limited to using an indexing function provided by write database 320 or searching through the data sets in write database 320. After identifying the corresponding data set, data streamer 330 may update the data set by replacing a portion of the data set with by the new information (e.g., when the new information comprises a new data element) or by replacing the entire data set with the new information (e.g., when the new information comprises an entire data set). Additionally or alternatively, if no corresponding data set is found in write database 320, data streamer 330 may create a new data set in write database 320 and store the new information in the new data set.

At step 430, once the corresponding data set is updated or a new data set is added, data streamer 330 may read the new or updated data set in its entirety back from write database 320 for replication to read databases 360A-360B. As noted herein, data streamer 330 may read, from write database 320, data sets in their entirety even if the new information updated only a portion of the data set in order to simplify the replication process. For example, when the new information comprises only a portion of a data set stored in write database 320, replicating just the particular portion to read databases 360A-360B would require searching through the data set in read databases 360A-360B to identify the data set corresponding to the portion and updating the particular portion, which is more or less the same process as updating the write database 320 and defeats the purpose of having dedicated write database and read databases. Such process would also take more computational resources and time than just overwriting the entire data set as made possible by the disclosed embodiments.

In some embodiments, data streamer 330 may read the data set with a timestamp or record the time when the data set was read. The timestamps may be used to keep a snapshot of the data set as it updated over time and/or serve as references that other systems (e.g., data queuer 340 or replicated streamers 350A-350B) can use to keep track of their respective update processes.

At step 440, data queuer 340 may receive the data set from data streamer 330 and add it to a queue, a sequence, or a stack in a buffer. In some embodiments, data queuer 340 may store the data set with the timestamp received from data streamer 330 or associate the data set with a timestamp corresponding to the time the data set was added to the buffer. In some embodiments, steps 450 and 460 may occur periodically or constantly as new information becomes available from data source 310.

At steps 450 and 460, replicated streamers 350A-350B may each replicate the data set stored in the buffer and overwrite a corresponding data set in their respective read databases 360A-360B. For example, replicated streamer A 350A may access the buffer within data queuer 340 to replicate a data set stored therein, identify a data set in read database A 360A that corresponds to the replicated data set, and overwrite the identified data set with the replicated data set. In this way, the new information from data source 310 is written to database 320 to become a part of a master set representing a snapshot of the data set at a moment in time and is made available in read databases 360A-360B for access by other systems (e.g., mobile devices 107A-107C or other servers). In some embodiments, steps 450 and 460 may occur periodically or constantly as new data sets accrue in the buffer.

In some embodiments, each replicated streamer (e.g., 350A or 350B) may function independently of each other based on respective replicated streamer's schedule. This allows the read databases 360A-360B to stay independent of each other and serve as a backup in case one of them becomes offline (e.g., due to maintenance or failure) or network load from incoming queries surges. In some embodiments, each replicated streamer (e.g., 350A or 350B) may use the timestamps associated with the data sets in the buffer to keep track of which data set it already replicated to its corresponding read database (e.g., 360A or 360B) and which data set it should replicate next.

Figure 5:
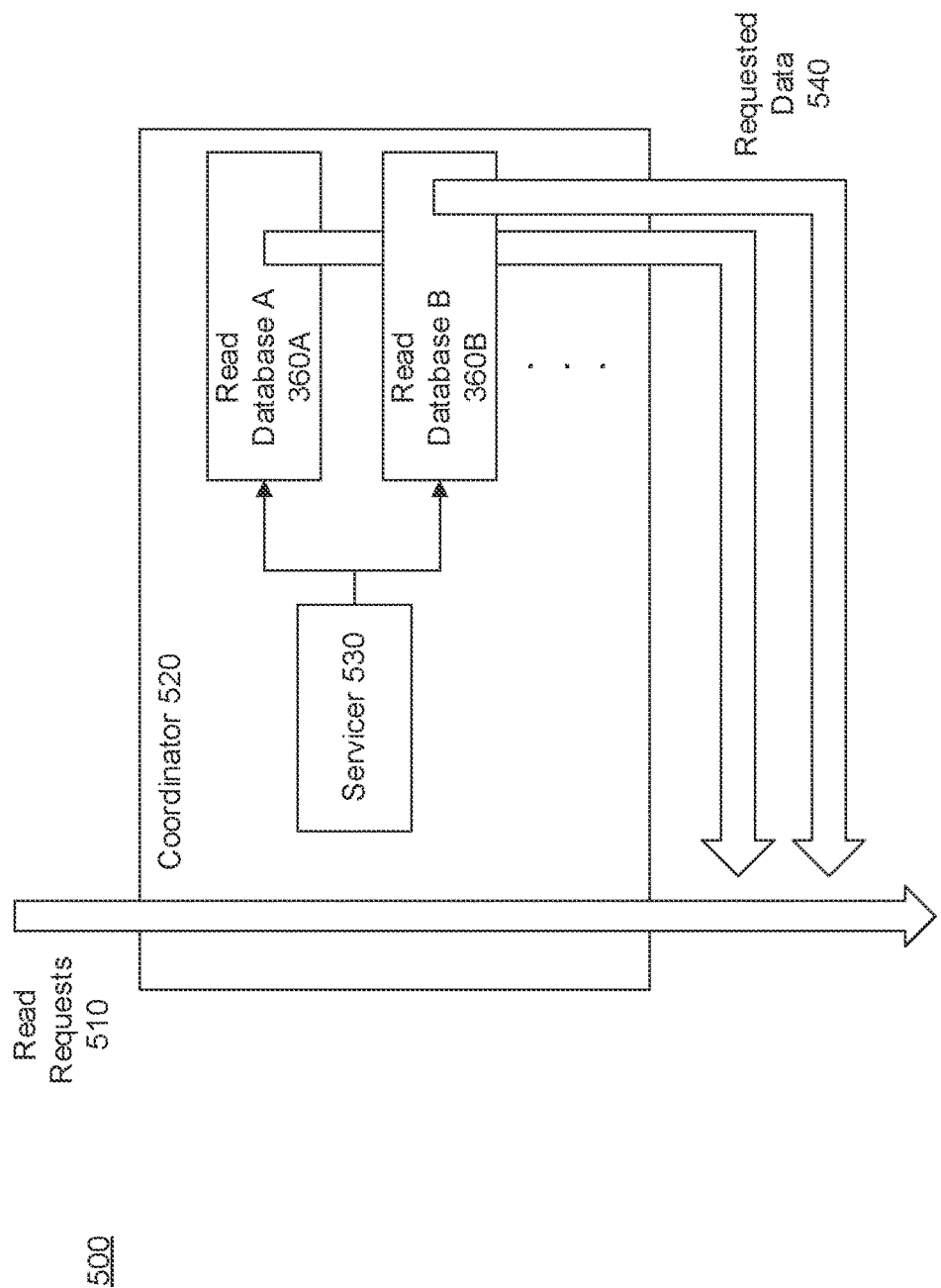
FIG. 5 is a schematic block diagram illustrating an exemplary embodiment of a networked environment comprising computerized systems for processing incoming queries, consistent with the disclosed embodiments.

FIG. 5 is a schematic block diagram illustrating an exemplary embodiment of a networked environment 500 comprising computerized systems for processing incoming queries (e.g., read requests 510). Networked environment 500 may comprise a variety of computerized systems, each of which may be connected to one another via one or more networks. In some embodiments, each of the elements depicted in FIG. 5 may represent a group of systems, individual systems in a network of systems, functional units or modules inside a system, or any combination thereof. And in some embodiments, each of the elements may communicate with each other via one or more public or private network connections including the Internet, an intranet, a WAN (Wide-Area Network), a MAN (Metropolitan-Area Network), a wireless network compliant with the IEEE 802.11a/b/g/n Standards, a wired network, or the like. The individual systems can also be located within one geographical location or be geographically dispersed.

In some embodiments, the depicted systems include a coordinator 520 comprising a servicer 530, and read databases 360A-B described above with respect to FIG. 3. While only two pairs of replicated streamer and read database are depicted in FIG. 5, the number is only exemplary and additional read databases may be implemented.

Furthermore, each system depicted in FIG. 3 may take the form of a server, general-purpose computer, a mainframe computer, a special-purpose computing device such as a graphical processing unit (GPU), laptop, or any combination of these computing devices. In other embodiments, each system or a subset of the systems may be implemented as one or more functional units of a single system. Additionally or alternatively, each system or a subset thereof may be a standalone system, or a part of a subsystem, which may be part of a larger system.

Coordinator 520, in some embodiments, may be any computerized system configured to receive one or more read requests 510 and provide requested data 540 that were stored in read databases 360A-360B. Read requests 510 may be incoming queries from other systems such as SOT system 111 or client devices such as mobile devices 107A-107C. Requested data 540 may be any data set or a portion thereof that are requested by read requests 510 and retrieved from any of read databases 360A-360B.

In some embodiments, coordinator 520 may be configured to serve as a centralized receiver or processor of read requests 510 that manages load on different read databases 360A-360B by determining which read database to read from. This configuration keeps read requests 510 simple and easy to implement from clients' point of view. In other words, a programmer or network administrator trying to interface a client device (e.g., mobile devices 107A-107C or SOT system 111) with a database implementing the disclosed embodiments (e.g., SAT system 101) only needs to specify one destination for read requests instead of having to determine which read database (e.g., 360A-360B) is available. In some embodiments, coordinator 520 may further be configured to manage read databases 360A-360B, being able to bring any or all read databases 360A-360B online or offline as well as adding or removing a read database from the networked environment.

Servicer 530, in some embodiments, may be any computerized system configured to monitor status of read databases 360A-360B and determine which read database (i.e., one of read databases 360A-360B) should service a particular read request 510. Coordinator 520 may use a built-in software development kit (SDK) for interfacing with servicer 530.

In some embodiments, servicer 530 may keep track of which read database is online and their respective health using various sensors and system monitors. For example, servicer 530 may be configured to monitor diagnostic parameters (e.g., temperature, age, or level of electrical current draw) of each read database. In some embodiments, such data may be useful for determining any risk of failure in any of read databases 360A-360B and taking appropriate measures to reduce the risk (e.g., replacing one or more storage devices in the corresponding read database, taking the read database offline for maintenance).

In further embodiments, servicer 530 may keep track of the read databases (i.e., any of read databases 360A-360B) it used to service read quests 510. Additionally or alternatively, servicer 530 may keep track of the read database that has not serviced a read request for the longest time. Such data may prevent servicer 530 from relying too much on a particular read database or allow servicer 530 to choose another read database while the previous read database is locating and transmitting requested data 540.

Once servicer 530 has determined a particular read database (e.g., read database A 360A) to service a read request 510, servicer 530 may be configured to relay read request 510 to the determined read database. The determined read database may then retrieve a copy of requested data 540 corresponding to read request 510 and forward it to the user device in a process described below with respect to FIG. 6. In this case, the other read databases (e.g., read database B 360B) may take no part in processing the particular read request 510 and be free to process another read request as relayed by servicer 530.

FIG. 6 is a flowchart of another exemplary computerized process 600 for processing incoming queries. Process 600 may be implemented on any server that must service a large number of queries such as, for example, SAT System 101, SOT system 111, and/or FO system 113. Such server may comprise networked systems such as those described above in FIG. 5. Process 600 is described below with reference to the networked systems of FIG. 5, but any other configuration of systems, subsystems, or modules may be used to perform process 600.

At step 610, servicer 530 may keep track of usage history for read databases 360A-360B to monitor their server utilization rates. The server utilization rates may refer to a ratio between the number of times each read database has been used over a predetermined period. For example, servicer 530 may express the server utilization rates in percentages or fractions of total number of serviced read requests 510 that have been serviced by each read database 360A-360B. In some embodiments, the server utilization rate of any offline read database 360A-360B may be equal to zero or a null value.

At step 620, coordinator 520 may receive a read request 510 from a client device (e.g., mobile device 107A-107C or SOT system 111) for certain data presumably stored in read databases 360A-360B. The requested data may be a particular data element (e.g., of a data set) or a set of data elements.

At step 630, servicer 530 may select a particular read database to service read request 510 based on the utilization rates and load sharing ratios. In some embodiments, the load sharing ratios may be predetermined ratios associated with the read databases 360A-360B that dictate how much each read database should be utilized relative to each other. For example, in a networked environment comprising two read databases 360A-360B, the load sharing ratios may be 100:0, 50:50, 25:75, 10:90, etc. Alternatively, in another networked environment comprising three read databases (not shown), the load sharing ratios may be 33.3:33.3:33.3, 25:50:25, 100:0:0, 50:50:0 etc. The ratios enumerated herein are only exemplary and any set of ratios suitable for splitting tasks among a plurality of members may be used. In some embodiments, a read database with a load sharing ratio of 0 may indicate that no data request 510 can be serviced by the read database (e.g., due to being offline).

In some embodiments, the load sharing ratios may be predetermined by a network administrator based on anticipated network load and the number of available read databases 360A-360B. For example, if the anticipated load is relatively low and/or if a read database must be taken offline for maintenance, the network administrator may set the load sharing ratios to be 100:0 or 0:100 based on which read database must be offline. Alternatively, if both read databases 360A-360B will be online, the load sharing ratios may be 50:50. In some embodiments, if the network administrator inputted a wrong set of values for the load sharing ratios that does not add up to 100, servicer 530 may determine the correct load sharing ratios by dividing each ratio by the their sum. (e.g., 120:80 would become 60:40).

In further embodiments, the load sharing ratios may be freely adjustable as necessary. For example, when only read database A 360A was servicing read requests 510 (i.e., the load sharing ratios are 100:0) and the network load surges to the point that requires an additional read database, the load sharing ratios may be adjusted to 50:50 so that read database B 360B can be brought online and share the load. Furthermore, when, e.g., read database A 360A must be taken offline due to an error, the load sharing ratios may be adjusted to 0:100. In another example, if a third read database (not shown) is brought in to replace read database A 360A, the load sharing ratios may be adjusted to 0:50:50. In any situation, the network administrator may input, and servicer 530 may receive an input therefrom, for specifying new load sharing ratios to adjust the existing ratios.

Still further, in some embodiments, servicer 530 may be configured to adjust the load sharing ratios automatically based on the statuses of read databases 360A-360B. For example, when servicer 530 detects that read database A 360A is at a critical state (e.g., encountered an error, crashed, lost power, is targeted by a malicious attack), servicer 530 may adjust the load sharing ratios so that read database B 360B services all read requests 510. Such configuration may allow servicer 530 to respond quickly to unexpected incidents that may jeopardize the entire system at a rate no human could detect and react.

In some embodiments, servicer 530 may effectuate the adjustment to the load sharing ratios gradually. For example, when servicer 530 receives a user input instructing servicer 530 to adjust the load sharing ratios from 50:50 to 0:100, servicer 530 may adjust the load sharing ratios in steps so that the load sharing ratios change, e.g., 50:50, 40:60, 30:70, 20:80, 10:90, and 0:100. Changing the load sharing ratios back to 50:50 may occur using a similar set of ratios in a reverse order. The amount of change in each step is only exemplary and servicer 530 may space the adjustments at any increments that maximizes useful life of read databases 360A-306B and/or alleviates stress thereto.

This gradual adjustment of the load sharing ratios is necessary to allow read databases 360A-360B to warm up to their full performance level. The gradual adjustment may prevent or alleviate potential shock to read databases 360A-360B that may occur if a large number of read requests 510 are directed to a particular read database abruptly. Such sudden rush of read requests may cause the read database to fail if not properly addressed.

Going back to how servicer 530 selects a particular read database to service read request 510, the selection may be based on the utilization rates and load sharing ratio. In some embodiments, servicer 530 may compare the utilization rates of each read database 360A-360B against the load sharing ratios and select the read database whose utilization rate is less than the load sharing ratio. Alternatively, servicer 530 may select a read database using a pseudo random number generator (PRNG) weighted based on the load sharing ratio. More specifically, servicer may associate each read database 360A-360B to a number and pick one of the numbers using the PRNG, where the PRNG is weighted with the load sharing ratios so that the probability of selecting a particular number associated with a read database is equal to the load sharing ratio corresponding to the read database.

Still further, when servicer 530 is in the process of adjusting load sharing ratios, servicer 530 may need to move a subset of read requests 510 assigned to one read database (e.g., read database A 360A) to another read database (e.g., read database B 360B). For each read request 510, servicer 530 may calculate a move indicator using the following formula.

$$1 - \frac{\text{new load sharing ratio}}{\text{previous load sharing ratio}}$$

Servicer 530 may move particular read request 510 from the current read database (e.g., read database A 360A) to a new read database (e.g., read database B 360B) when the move indicator is not equal to 1, and keep the read request 510 at the current read database (e.g., read database A 360A) when the move indicator is equal to 1. In some embodiments where there are more than one read databases to move to, servicer 530 may use the PRNG to select a read database among the other read databases.

With respect to each read request 510, the read database (e.g., read database A 360A) selected for the read request may be switched to an active state, while the other, non-selected read databases (e.g., read database B 360B) may be switched to an active standby state. The read databases in both states may still continue to receive updated dataset as described above with respect to FIG. 4, so that all read databases are ready to respond to subsequent read requests. Each read database may freely switch between an active state and an active standby state with respect to each read request 510.

At step 640, servicer 530 may be configured to generate a data inquiry to the selected read database (e.g., read database A 360A) for retrieving a copy of the data requested by read request 510. In some embodiments, the selected read database may respond to the data inquiry by identifying the data requested as stored in the selected read database and duplicating the data for transmission as requested data 540. If the read database fails to identify the data requested, the read database may return a null value or a predetermined data.

At step 650, coordinator 520 may forward requested data 540 to the client device where that generated read request 510. In some embodiments, steps 620-650 may occur every time coordinator 520 receives read request 510, while servicer 530 continues to perform step 610.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for routing network traffic, the system comprising:
    a memory storing instructions; and
    at least one processor configured to execute the instructions for:
        monitoring a utilization rate of one or more databases;
        receiving a query;
        determining a load sharing ratio based on at least one of a status of the one or more databases, an amount of time the one or more databases have been available, one or more attributes of the one or more databases, an anticipated network load, a number of available databases of the one or more databases, or an input, wherein the load sharing ratio is a predetermined ratio indicative of an expected utilization rate of the one or more databases relative to each other;
        selecting a target database from the one or more databases based on the utilization rate and the load sharing ratio;
        retrieving data from the target database associated with the query; and
        transmitting the retrieved data to a user device.

2. The computer-implemented system of claim 1, wherein the one or more databases comprise at least one write database and at least one read database.

3. The computer-implemented system of claim 1, the instructions further comprising:
    receiving a write query;
    selecting a write database from the one or more databases based on the write query;
    identifying a data set in the write database associated with the write query; and
    updating the data set based on the write query.

4. The computer-implemented system of claim 3, the instructions further comprising:
    selecting a set of remaining databases from the one or more databases which are not the write database; and
    updating the remaining databases to contain the updated data set of the write database.

5. The computer-implemented system of claim 4, the instructions further comprising recording a time when the remaining databases were updated.

6. The computer-implemented system of claim 1, the instructions further comprising:
    receiving a second query; and
    selecting a second target database from the one or more databases different from the first target database based on at least one of the utilization rate or the load sharing ratio.

7. The computer-implemented system of claim 1, wherein the utilization rate of the one or more databases includes a ratio comparing a number of times each database of the one or more databases has been used over a predetermined period.

8. The computer-implemented system of claim 1, the instructions further comprising modifying the load sharing ratio based on a network load surge.

9. The computer-implemented system of claim 1, wherein the selecting the target database includes selecting a database from the one or more databases whose utilization rate is lower than the load sharing ratio.

10. The computer-implemented system of claim 1, wherein the query may be assigned to a different database from the one or more databases after being assigned to the target database based on the utilization rate and the load sharing ratio.

11. A computer-implemented method for routing network traffic, the method comprising:
    monitoring a utilization rate of one or more databases;
    receiving a query;
    determining a load sharing ratio based on at least one of a status of the one or more databases, an amount of time the one or more databases have been available, one or more attributes of the one or more databases, an anticipated network load, a number of available databases of the one or more databases, or an input, wherein the load sharing ratio is a predetermined ratio indicative of an expected utilization rate of the one or more databases relative to each other;
    selecting a target database from the one or more databases based on the utilization rate and the load sharing ratio;
    retrieving data from the target database associated with the query; and
    transmitting the retrieved data to a user device.

12. The computer-implemented method of claim 11, wherein the one or more databases comprise at least one write database and at least one read database.

13. The computer-implemented method of claim 11, the instructions further comprising:
  receiving a write query;
  selecting a write database from the one or more databases based on the write query;
  identifying a data set in the write database associated with the write query; and
  updating the data set based on the write query.

14. The computer-implemented method of claim 13, the instructions further comprising:
  selecting a set of remaining databases from the one or more databases which are not the write database; and
  updating the remaining databases to contain the updated data set of the write database.

15. The computer-implemented method of claim 14, the instructions further comprising recording a time when the remaining databases were updated.

16. The computer-implemented method of claim 11, the instructions further comprising:
  receiving a second query; and
  selecting a second target database from the one or more databases different from the first target database based on at least one of the utilization rate or the load sharing ratio.

17. The computer-implemented method of claim 11, wherein the utilization rate of the one or more databases includes a ratio comparing a number of times each database of the one or more databases has been used over a predetermined period.

18. The computer-implemented method of claim 11, the instructions further comprising modifying the load sharing ratio based on a network load surge.

19. The computer-implemented method of claim 11, wherein the selecting the target database includes selecting a database from the one or more databases whose utilization rate is lower than the load sharing ratio.

20. The computer-implemented method of claim 11, wherein the query may be assigned to a different database from the one or more databases after being assigned to the target database based on the utilization rate and the load sharing ratio.

\* \* \* \* \*